United States Patent
Theobold et al.

(10) Patent No.: US 7,230,566 B2
(45) Date of Patent: Jun. 12, 2007

(54) RADAR PROTECTION DEVICE FOR WIRELESS NETWORKS

(75) Inventors: David M. Theobold, Akron, OH (US); Christopher G. Meil, Copley, OH (US); Edward Frederick Wright, Middlefield, OH (US); James A. Amos, North Canton, OH (US); Brian Hart, Milpitas, CA (US); Jason R. Crawford, McMahons Point (AU); Philip O'Sullivan, Leichherdt (AU); Kevin C. H. Wong, St. Leonards (AU)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 10/910,682

(22) Filed: Aug. 3, 2004

(65) Prior Publication Data

US 2006/0028376 A1  Feb. 9, 2006

(51) Int. Cl.
  *G01S 7/40* (2006.01)
  *H04B 17/00* (2006.01)
(52) U.S. Cl. .................. 342/159; 342/195; 342/20
(58) Field of Classification Search .................. 342/159
  See application file for complete search history.

(56) References Cited

U.S. PATENT DOCUMENTS

| | | | |
|---|---|---|---|
| 6,675,012 B2 | 1/2004 | Gray | |
| 6,697,013 B2 | 2/2004 | McFarland et al. | |
| 6,831,589 B2 * | 12/2004 | Shearer, III | 342/20 |
| 7,024,188 B2 * | 4/2006 | Khun-Jush et al. | 455/423 |
| 2003/0107512 A1 | 6/2003 | McFarland et al. | |
| 2003/0206130 A1 | 11/2003 | Husted et al. | |
| 2003/0214430 A1 * | 11/2003 | Husted et al. | 342/57 |
| 2003/0224741 A1 * | 12/2003 | Sugar et al. | 455/115.1 |
| 2004/0132411 A1 | 7/2004 | Li | |
| 2004/0151137 A1 | 8/2004 | McFarland et al. | |
| 2004/0156336 A1 | 8/2004 | McFarland et al. | |
| 2004/0157580 A1 | 8/2004 | Stadelmeier et al. | |
| 2005/0059363 A1 | 3/2005 | Hansen | |
| 2005/0059364 A1 | 3/2005 | Hansen et al. | |

FOREIGN PATENT DOCUMENTS

WO  WO 02/082844 A2  10/2002

\* cited by examiner

*Primary Examiner*—Thomas H. Tarcza
*Assistant Examiner*—Matthew Barker
(74) *Attorney, Agent, or Firm*—Tucker Ellis & West LLP (57) ABSTRACT

A method for radar protection. The method includes recording energy events and calculating differences in recorded energy events to determine pulses. The method further includes sorting intervals between pulses into histogram bins, each bin representing a range of time intervals between two pulses, each pulse indicative of a radar frequency and limiting network traffic on a frequency based on a selected bin count.

29 Claims, 8 Drawing Sheets

*Figure 1*

*(Prior Art)*

RADAR PROTECTION DEVICE FOR WIRELESS NETWORKS

BACKGROUND OF THE INVENTION

The present invention relates generally to wireless networks and more particularly to a radar protection device and method for wireless networks.

Current and projected growth for unlicensed wireless devices operating in a frequency band located at approximately 5 Gigahertz has prompted national and international regulatory bodies to promulgate regulations that ensure that interference with incumbent systems is minimized. Such unlicensed wireless devices generally use packeted data and include, but are not limited to, wireless devices in accordance with the Institute of Electrical and Electronics Engineers (IEEE) 802.11 standard. More often than not, such regulations are, in part, due to military and weather radar operations ordinarily conducted within the band. Generally, the operation of more unlicensed devices within the band increases the opportunity for interference and raises the noise floor of the band, potentially compromising the operational performance of military and weather radar systems.

For instance, both the European Telecommunications Standards Institute (ETSI) and the Federal Communications Commission (FCC) have published requirements for radio local area network (RLAN) devices that operate in the Unlicensed National Information Infrastructure (U-NII) frequency bands between 5.250–5.350 and 5.470–5.725 Gigahertz. Further, the devices are required to employ a mechanism that allows the devices to share the spectrum with radar operations, notably military and weather radar operations, in such a way that the devices do not interfere with radar operations.

Short of the required sharing of the spectrum, one approach reports a measurement summary in a radio communications system. More specifically, once a mobile station within a system is tuned to a selected frequency range, a measurement is made of communications energy. If communications energy is measured or detected, the energy is decoded to determine whether the communications energy contains packeted data. If packeted data is detected, further analysis of the data packet is conducted to determine whether the packeted data is in accordance with the Institute of Electrical and Electronics Engineers (IEEE) 802.11 standard. If it is determined that the packeted data is 802.11 packeted data, a measurement summary field is populated with a value indicating the frequency range to which the mobile station is tuned. Otherwise, an indication is made that 802.11 packeted data is not being communicated on the frequency range to which the mobile station is tuned. The approach uses a rather complex delay correlation method for such determinations. Although this approach reports a measurement summary for a mobile station inclusive of whether or not communicated energy on a particular frequency is 802.11 packeted data, the approach fails to provide a radar protection system for wireless devices that allows the co-existence of a wireless network with radar systems.

However, another approach does allow the co-existence of a wireless network with radar systems. More specifically, this approach provides radar detection and dynamic frequency selection for wireless local area networks. Further, this approach includes a radar detection process that performs a frequency domain analysis of an incoming signal to derive phase and magnitude information, the output of which is binned into 52 bins of 300 kilohertz. The bins are analyzed to identify and distinguish among different types of radar such as continuous wave tone radar and chirping radar in which the pulses are swept across a frequency range. With radar, the power is typically concentrated in one of the bins, or at a specific frequency.

This approach also provides analysis of a packet to determine whether there are any spikes within the packet above a certain threshold, as a spike might indicate a radar signal. The amplitude and duration, i.e., pulse width, of the spike is analyzed to determine whether or not the spike is indicative of a radar signal. Spikes within the packet may be time-stamped so that the spike can be treated as a new or separate event.

This approach also determines the period of a signal once a particular event is determined to be a radar signal through a frequency domain analysis of the length and magnitude of the event. Similarly, a frequency domain analysis is used to determine the period of a signal.

Particularly, this approach uses the forgoing radar detection process at an access point, and if the access point detects the presence of a radar signal, the access point changes channels. Despite providing a radar protection system for wireless devices that allows the co-existence of a wireless network with radar systems, the radar detection process associated with this approach is of limited utility. Foremost, the use of Fast Fourier Transform, Discrete Fourier Transform, or time domain analysis is particularly burdensome. All of these types of analysis require significant computational and processing capabilities. Moreover, such processing can take a considerable amount of time. Further, capabilities inherent in current access points are generally insufficient to allow the use of such types of analysis. Therefore, many existing access points are not capable of using analysis processes associated with this approach.

Thus, there exists a need for a radar protection device and method that addresses the regulatory requirements and allows the co-existence of a wireless network with radar systems.

SUMMARY OF THE INVENTION

The present invention addresses regulatory requirements and allows the co-existence of a wireless network with radar systems. More particularly the present invention scans for the presence of radar signals and, upon detection, limits transmissions of the wireless network device on the same frequency, thereby reducing interference with and protecting the operation of radar systems.

In accordance with the present invention there is disclosed a method for radar protection. The method includes recording energy events, calculating temporal differences in recorded energy events to determine the presence of pulses, sorting intervals between pulses into histogram bins (each bin representing a range of time intervals between two pulses, and each pulse indicative of a radar frequency), and limiting network traffic on a frequency based on a selected bin count.

Further in accordance with the present invention there is disclosed a radar protection device. The device includes a receive antenna and a receiver circuit configured to record energy events and a controller coupled to the receiver circuit and configured to execute program code that allows co-existence with radar systems. The program code includes instructions that command the controller to calculate temporal differences in the recorded energy events to determine the presence of pulses and sort intervals between the pulses into histogram bins, each bin representing a range of time intervals between two pulses, each pulse indicative of a radar frequency. The device further includes a transmit antenna and a transmit circuit coupled to the controller. The program code further includes instructions that command the controller to cause the transmit circuit to limit network traffic on a frequency based on a selected bin count.

In one aspect of the present invention, a computer-readable medium of instructions for radar protection includes means for recording energy events, means for calculating temporal differences in recorded energy events to determine the presence of pulses, means for sorting intervals between pulses into histogram bins, each bin representing a range of time intervals between two pulses, each pulse indicative of a radar frequency; and means for limiting network traffic on a frequency based on a selected bin count.

By virtue of the foregoing, there is thus provided a radar protection device and method that addresses the regulatory requirements and allows the co-existence of a wireless network with radar systems.

These and other objects and advantages of the present invention will become readily apparent to those skilled in this art from the following description wherein there is shown and described a preferred embodiment of this invention, simply by way of illustration of one of the best modes suited to carry out the invention. As it will be realized, the invention is capable of other different embodiments and its several details are capable of modifications in various obvious aspects all without departing from the spirit of the present invention. Accordingly, the drawings and descriptions will be regarded as illustrative in nature and not as restrictive.

BRIEF DESCRIPTION OF THE DRAWINGS

The accompanying drawings, which are incorporated in and constitute a part of this specification, illustrate embodiments of the present invention and, together with a general description of the invention given above, and the detailed description given below, serve to explain the principles of the present invention.

DETAILED DESCRIPTION OF THE DRAWINGS

Figure 1:
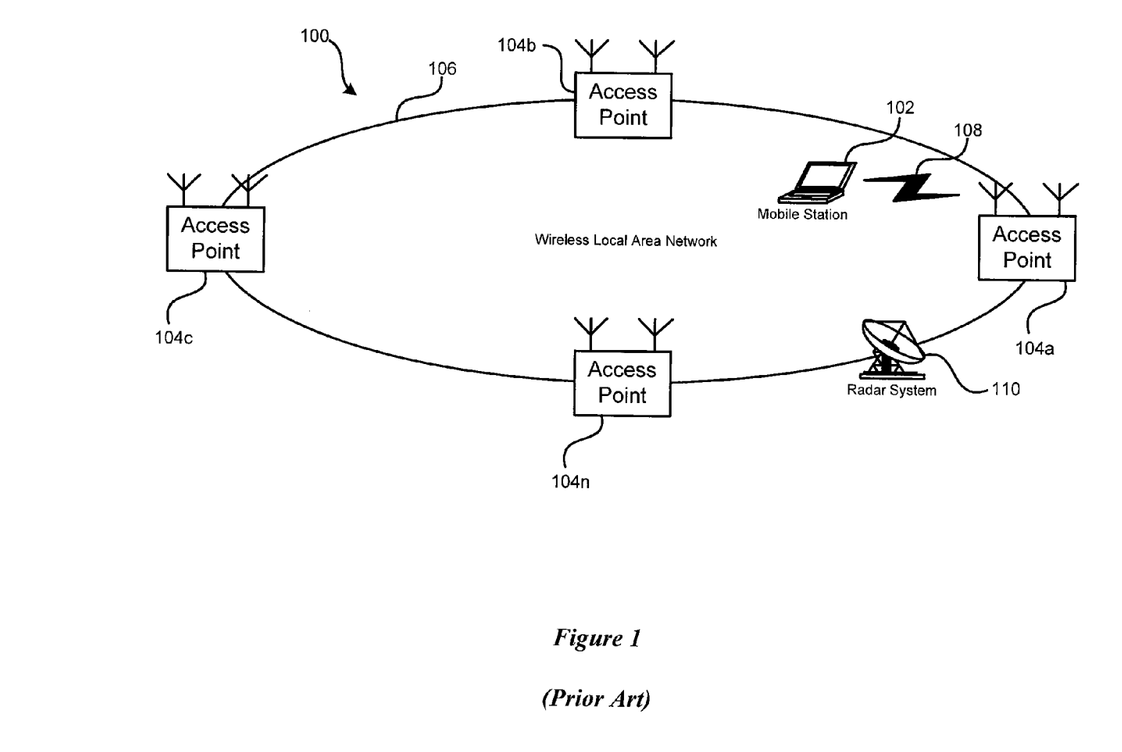
FIG. 1 is a block diagram of a radar system and wireless local area network including a number of access points in accordance with principles of the present invention.

Turning to the Drawings, wherein like numbers denote like parts, FIG. 1 shows a wireless local area network 100 configured to provide wireless data communications with a mobile station 102. Further, wireless local area network 100 and mobile station 102 operate in accordance with the Institute of Electrical and Electronics Engineers (IEEE) 802.11 standard in a frequency band located at approximately 5 Gigahertz. More specifically, wireless local area network 100 operates in accordance with requirements published by the European Telecommunications Standards Institute (ETSI) and the Federal Communications Commission (FCC) for unlicensed wireless devices that operate in the Unlicensed National Information Infrastructure (U-NII) frequency bands between 5.250–5.350 and 5.470–5.725 Gigahertz. Further, wireless local area network 100 includes a radar protection device that allows the network to share the spectrum with radar operations, e.g., military and weather radar operations, in such a way that the network does not interfere with the radar operations.

To this end, wireless local area network 100 includes one or more access points 104a–n, where "n" denotes any practical number of access points. Access points 104a–n are advantageously interconnected using a fixed backbone network 106. As shown and in operation, packeted data is communicated using a wireless link 108 between mobile station 102 and a selected access point 104a. More specifically, packeted data transmitted by access point 104a to mobile station 102 using wireless link 108 is transmitted on what is commonly referred to as a forward link channel, while packeted data transmitted by mobile station 102 to access point 104a is transmitted on what is commonly referred to as a reverse link channel.

Those of ordinary skill in the art will appreciate that access points 104a–n can also advantageously be dedicated to or used as a bridge. In a bridge application or configuration, an access point 104a–n is primarily dedicated to wirelessly communicating with another access point. In such a configuration, an access point 104a–n typically uses a directional antenna aimed or pointed at the other access point to provide additional gain and selectivity. An access point 104a–n configured as a bridge generally does not communicate with a mobile station 102. Thus, the present invention is not limited to access points 104a–n that communicate with mobile stations; but rather, includes access points configured as bridges.

In the Unlicensed National Information Infrastructure (U-NII) frequency bands frequency bands between 5.250–5.350 and 5.470–5.725 Gigahertz, forward and reverse link channels are not assigned to particular systems. In other words, wireless local area network 100 is not assigned a portion of the frequency band(s) for its exclusive use. Rather, wireless local area network 100 must share the frequency band(s) with other concurrently operated systems, notably radar systems. Radar systems include, but are not limited to, military and weather radar systems ordinarily operated within the band(s), an exemplary radar system being shown at reference numeral 110. To prevent simultaneous usage of the same portion of the frequency band(s), a dynamic frequency selection scheme is to be utilized by a system operating within the band(s) according to current published requirements by both the Federal Communications Commission and the European Telecommunications Standards Institute.

Generally speaking, in a dynamic frequency selection scheme, channels within the band(s) are dynamically selected for use based upon whether or not the channel is being used by another system. More specifically and in accordance with one aspect of the present invention, if a channel is being used by a radar system, e.g., radar system 110, access points 104a–n select another channel for data communications. Furthermore, when using a dynamic frequency selection scheme in accordance with teachings of the present invention, the same channel is not used by both a radar system 110 and a wireless local area network 100.

Figure 2:
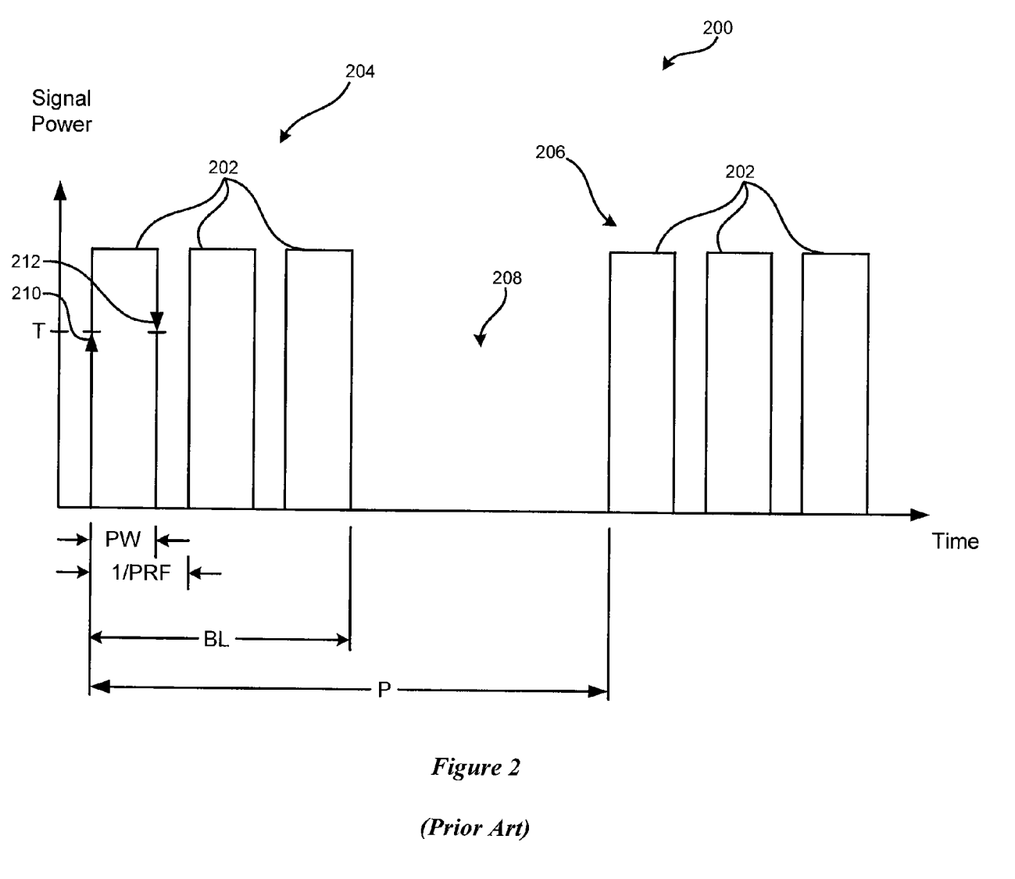
FIG. 2 is a graphical depiction of a typical radar signal transmitted by the radar system shown in FIG. 1.

Radar signals are characterized by bursts of periodic pulses of radio frequency energy. These pulses are distinguishable from wireless network transmissions due to their periodicity and relatively short pulse width. The number of pulses and the period of time between the pulses vary for different types of radar. Despite this variation, the number of pulses and the period of time between the pulses may be parameterized. Referring to FIG. 2, an exemplary radar signal 200 transmitted by radar system 110 of FIG. 1 is shown. Radar signal 200 comprises a series of pulses 202 received in a series of bursts, two bursts of which are shown at reference numerals 204 and 206, respectively. The bursts 204, 206 are separated by a period of time generally indicated at reference numeral 208. Each pulse 202 represents a high frequency, i.e., approximately 5 Gigahertz, sine wave or modulated wave having a pulse duration or pulse width (PW) of approximately one to twenty microseconds. However, pulse widths of several hundred microseconds are known. The period of time between the start of consecutive pulses is referred to as the pulse period and is the inverse of the pulse repetition frequency (PRF), designed as (1/PRF). The burst length (BL) is the number of pulses 202 in a burst 204, 206 or, equivalently, the time taken for a burst 204, 206 of pulses 202. The burst interval (P) is the time taken between two equivalent reference points in two consecutive bursts 204, 206, and typically is between approximately 1–60 seconds.

Thus, as illustrated in FIG. 2, radar signal 200 is characterized by periodic pulses and periodic bursts and is parameterized accordingly. It will be appreciated by the skilled artisan that radar signal 200 exemplifies a rotating radar signal and that a tracking radar signal will not appear as periodic busts. However, the present invention also applies to tracking radar signals using the periodicity between pulses. Referring to FIGS. 1 and 2, and in accordance with an aspect of the present invention, the periodic characteristics of radar signal 200 are used by wireless local area network 100 to identify transmissions from a radar system 110. More specifically, access points 104a–n within wireless local area network 100 are configured for radar protection through the inclusion of a radar protection device.

Figure 3:
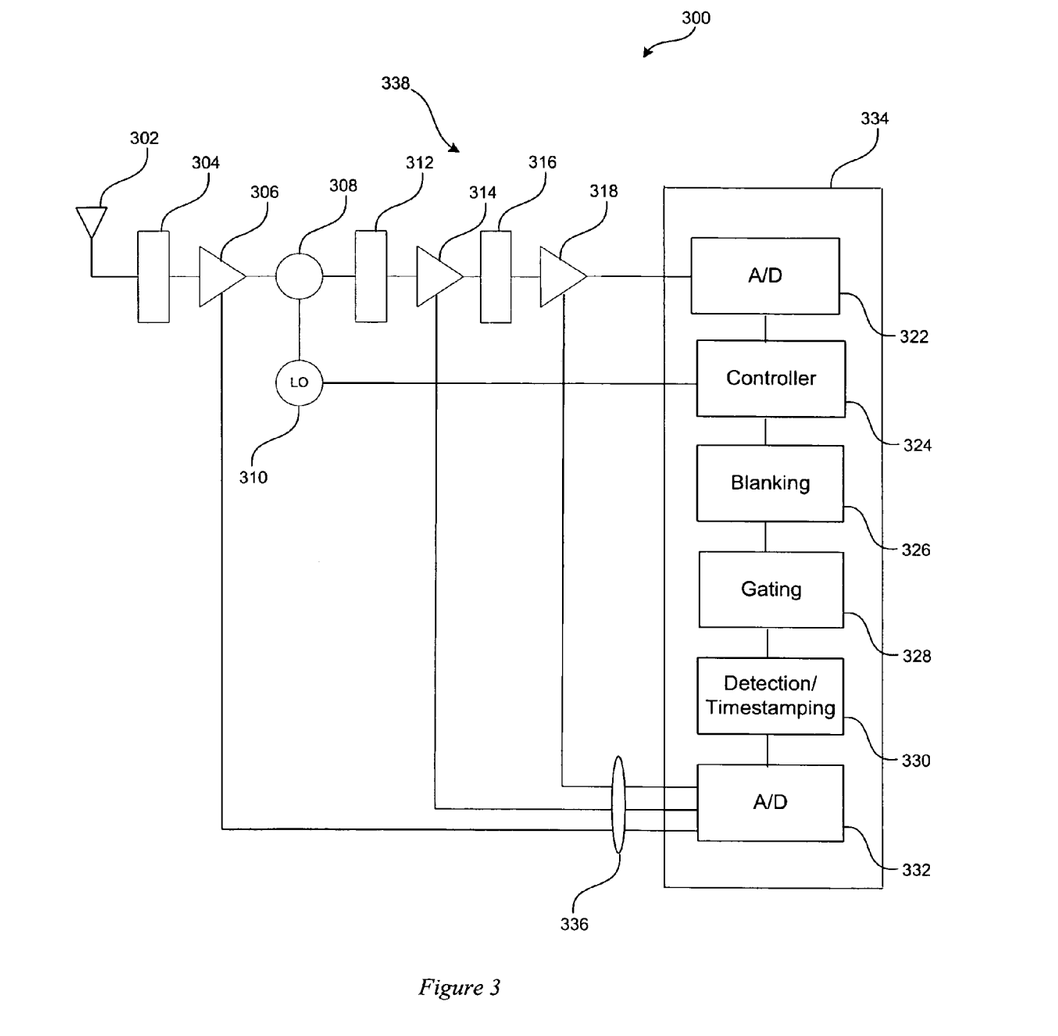
FIG. 3 is a functional block diagram of a portion of a typical access point in accordance with principles of the present invention.

Turning to FIG. 3, a block diagram of a receiver portion of a typical access point 300 (e.g., access points 104a–n illustrated in FIG. 1) configured in accordance with principles of the present invention is shown. As shown, access point 300 includes a receive antenna 302 coupled to a bandpass filter 304 and a low noise amplifier 306, for receiving packeted data on a reverse link channel. Access point 300 further includes a mixer 308 and an associated local oscillator 310 responsive to a controller 324, coupled to low noise amplifier 306 for tuning to or selecting a receive frequency or channel. A series of bandpass filters 312, 316 and amplifiers 314, 318 are coupled to mixer 308 and analog-to-digital converter 322, and complete a receive path 338. In accordance with an aspect of the present invention, receive path 338 is used to detect radar signals.

As also shown, an 802.11 physical interface controller 334 comprises analog-to-digital converters 322, 332, controller 324, blanking 326, gating 328, and detection and timestamping 330.

In operation, and as exemplified by connections 336, the power supply currents of amplifiers 306, 314, and 318 are integrated and coupled to analog-to-digital converter 332. The integration of the power supply currents form received signal strength indication (RSSI) signals. In accordance with an aspect of the present invention, one or more received signal strength indication signals are used over time to detect radar. More specifically, when receive path 338 receives a signal, and a received signal strength indication signal greater than a threshold, for example, greater than −64 dBm, is indicated, detection and timestamping 330 stores or records the event in memory. For example, the event in memory can be stored as four consecutive 16-bit words. Further, the lower two words can record information as to the type of event, along with other information, while the upper two words are an actual 32-bit (rollover) timer count at the time of the event. Controller 324 is operational to process events stored or recorded in memory to detect radar as will be described hereinafter. Blanking 326 and gating 328 is used for times when access point 300 is either transmitting or receiving packet data such that transmitted and received packeted data is not recorded.

Figure 4:
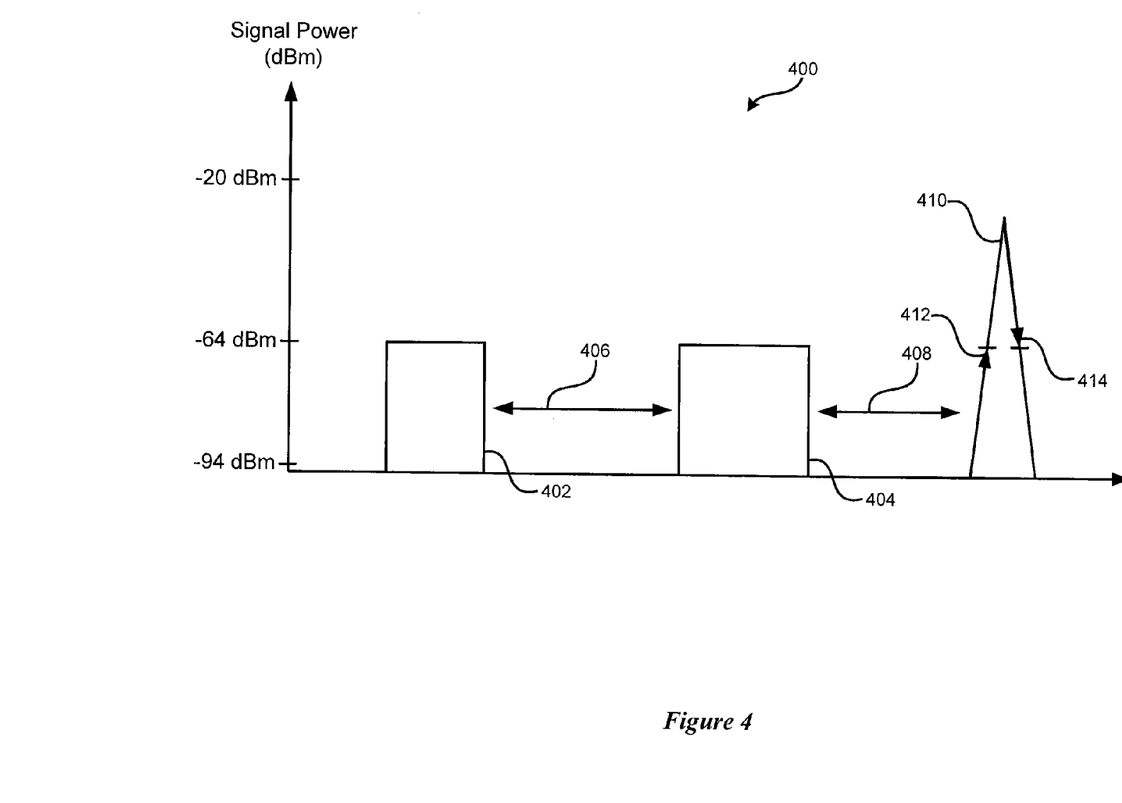
FIG. 4 is a graphical depiction of a typical signal indicating the operation of the access point shown in FIG. 3.

Referring to FIG. 4, a depiction of a typical signal 400 indicating the operation of access point 300 shown in FIG. 3 is illustrated. Access point 300 is generally capable of receiving signals ranging in magnitude between approximately −94 and −20 dBm, as generally indicated on the ordinate or y-axis. Signals greater than −20 dBm typically overdrive or saturate the receive path 338 of access point 300. Time is generally indicated on the abscissa or x-axis. Those of ordinary skill in the art will appreciate that the present invention applies equally well to access points having differing receive sensitivities.

As mentioned, signal 400 includes portions 402, 404 in which access point 300 is transmitting and receiving packeted data, respectively. It will be appreciated that portions or packets 402, 404 need not have amplitudes equaling −64 dBm; rather, this amplitude was merely for convenience and purposes of illustration. Transmitted and received packet data is generally between approximately 24 microseconds and 1.5 milliseconds in duration. During those periods 402, 404, receive path 338 is effectively blanked. It will be appreciated that, in some embodiments, much of the same receive path 338 is used for both radar detection and packet reception. In these embodiments, only the radar detection path is blanked while the access point receives packets.

It will be appreciated that access point 300 includes accommodations for distributed coordinate function interframe space (DIFS) and random backoff; in which case, the periods for transmitting and receiving packeted data vary. Further, access point 300 can include accommodations for a "quiet period" before, during, or after the transmission of each packet.

Between transmitting and receiving packeted data, access point 300 "listens" for radar during clear channel assessment (CCA) using receive path 338. Exemplary periods for listening or clear channel assessment are generally indicated at reference numerals 406 and 408, while a detected radar spike or signal is indicated at reference numeral 410. Typically, a radar signal 410 is a pulse of approximately 4 microseconds in duration; however, pulses as long as hundreds of microseconds are known.

In order for a radar signal to be detected, the signal exceeds a threshold. For example, radar signal 410 exceeds a threshold of −64 dBm, as generally indicated by arrows 412 and 414. Those of ordinary skill in the art will appreciated that such a threshold can be set to any appropriate power level as desired.

Figure 5:
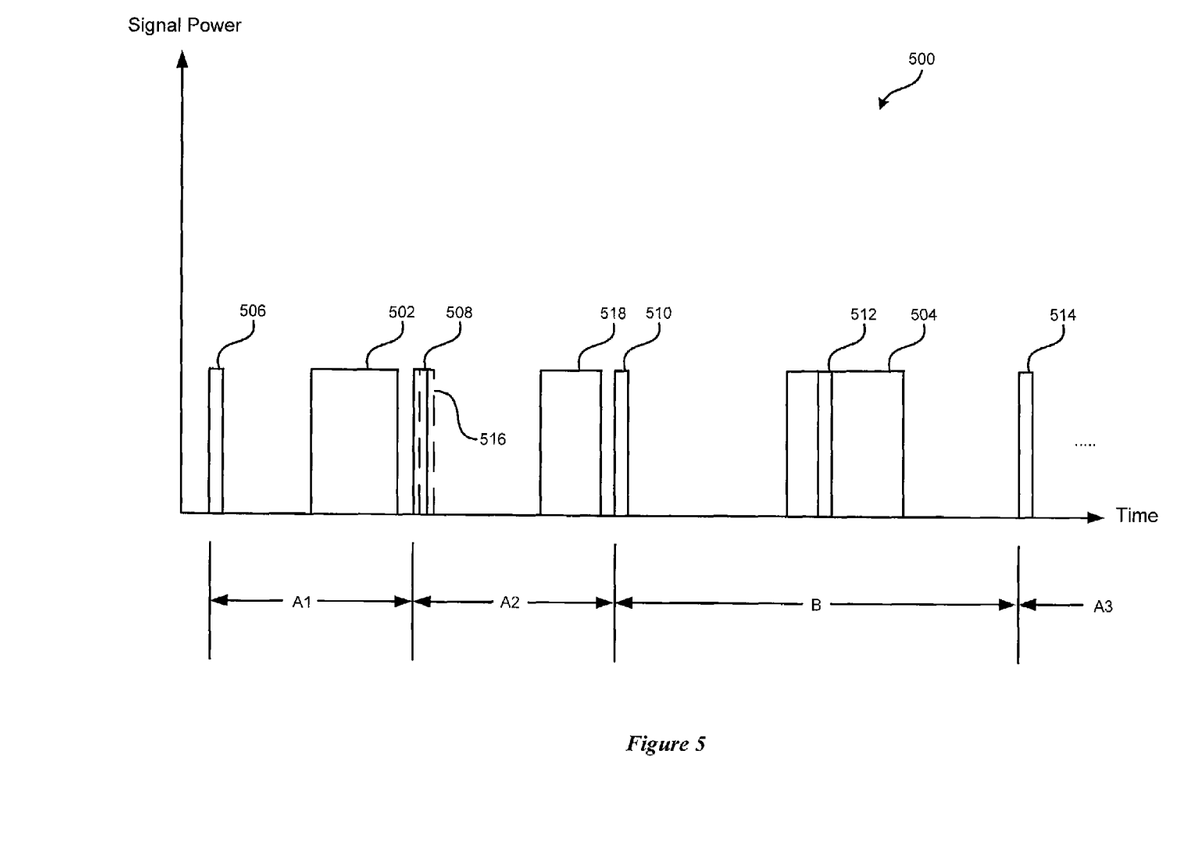
FIG. 5 is a temporal plot of the operation of the access point shown in FIG. 3.

Referring to FIG. 5, a temporal plot 500 of the operation of access point 300 shown in FIG. 3 is illustrated. Generally, time is indicated on the abscissa or x-axis and power or magnitude is indicated on the ordinate or y-axis. More specifically, temporal plot 500 shows transmitted and received packeted data 502, 504, respectively, and a series of periodic radar bursts or pulses 506, 508, 510, 512, 514, etc. As shown in dashed line at reference numeral 516, radar pulses 506, 508, 510, 512, 514, etc. are subject to some "jitter" or variation in time. In accordance with one aspect of the present invention, such jitter is allowed for in the detection of radar through "binning" as will be shown hereinafter.

In detecting a radar signal, received signal strength indication events during the transmission or reception of packeted data are ignored. Further, pulses that are either too narrow or too wide are ignored, as are pulses with too much width variation. An exemplary pulse that is either too narrow or too wide or has too much width variation is shown at reference numeral 518. Thus, transmitted and received packeted data 502, 504 and exemplary pulse 518 are eliminated from spectrogram 500. It will be appreciated that radar pulse 512 is also effectively eliminated along with received packeted data 504. As will be shown hereinafter, despite eliminating radar pulse 512, the present invention is still capable of detection the operation of a radar system.

Once transmitted and received packeted data 502, 504, pulse 512, and exemplary pulse 518 are eliminated, the intervals between radar pulses 506, 508, 510, 514, etc. are designated as A1, A2, B, and A3, respectively. It will be appreciated that intervals A1, A2, and A3 are similar, while interval B is longer due to the elimination of pulse 512 with packeted data 504. In accordance with another aspect of the present invention, intervals between pulses that are either too narrow or too wide are discarded; as such intervals are not generally indicative of a radar signal.

Figure 6:
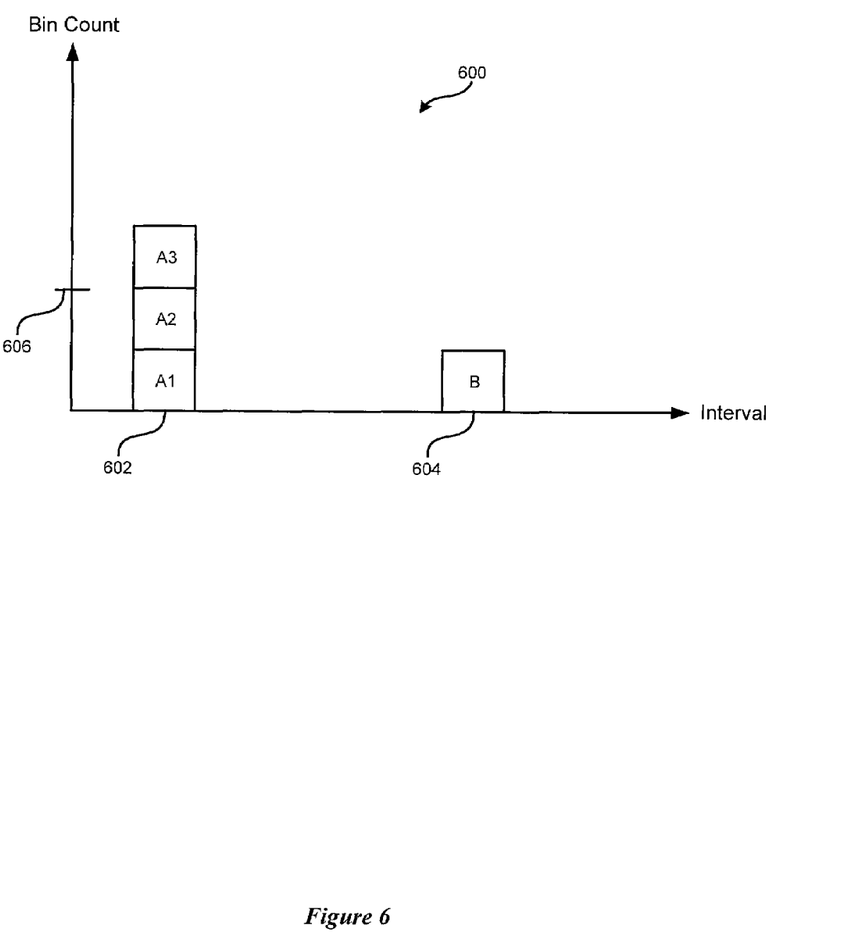
FIG. 6 is a histogram of the pulse intervals shown in FIG. 5.

Referring to FIG. 6, a histogram 600 is built in memory using the intervals. Such a memory is advantageously included in application specific integrated circuit 334 or as part of controller 324, both of which are shown in FIG. 3. In other embodiments of the present invention, a memory external to an application specific integrated circuit or a controller can be used.

More specifically, histogram 600 includes a plurality of bins, e.g., bins 602, 604, denoting the interval between two pulses arranged along the abscissa or x-axis. Bins 602, 604 generally cover a range of intervals such as, for example, 200–250 microseconds and 400–500 microseconds, respectively The number of occurrences, e.g., a "bin count", of an interval between two pulses falling in a range is indicated on the ordinate or y-axis. Those of ordinary skill in the art will appreciate that any number of bins having any desired ranges may be used.

As shown, intervals A1, A2, B, A3 have been binned. Thus, bin 602 contains intervals A1, A2, and A3, and bin 604 contains interval B. Once the count within one or more bins 602 exceeds are particular bin count 606, access point 300 discontinues use of that frequency or channel associated with those pulses and engages in dynamic frequency selection (DFS), thereby utilizing another available channel. Those of ordinary skill in the art will appreciate that a bin count 606 may be adjusted as desired to change when or how quickly a radar signal is detected.

For example, one criterion that can be used to detect a radar signal is that if fewer than a particular number of bins are populated with intervals and if any of the bin counts are greater than some number, dynamic frequency selection is engaged. Such a criteria prevents false detections of radar. It has been found that if closely spaced bins have respective bin counts that follow a Gaussian distribution, a radar signal is not present; but rather, the access point 300 is detecting its own transmissions. Thus, closely spaced bins having bin counts that follow a Gaussian distribution should be ignored. In such an instance, the bins 602, 604, should purged, reset, or cleared. Similarly, the bins 602, 604 can be cleared periodically or once a radar signal has been detected.

Figure 7:
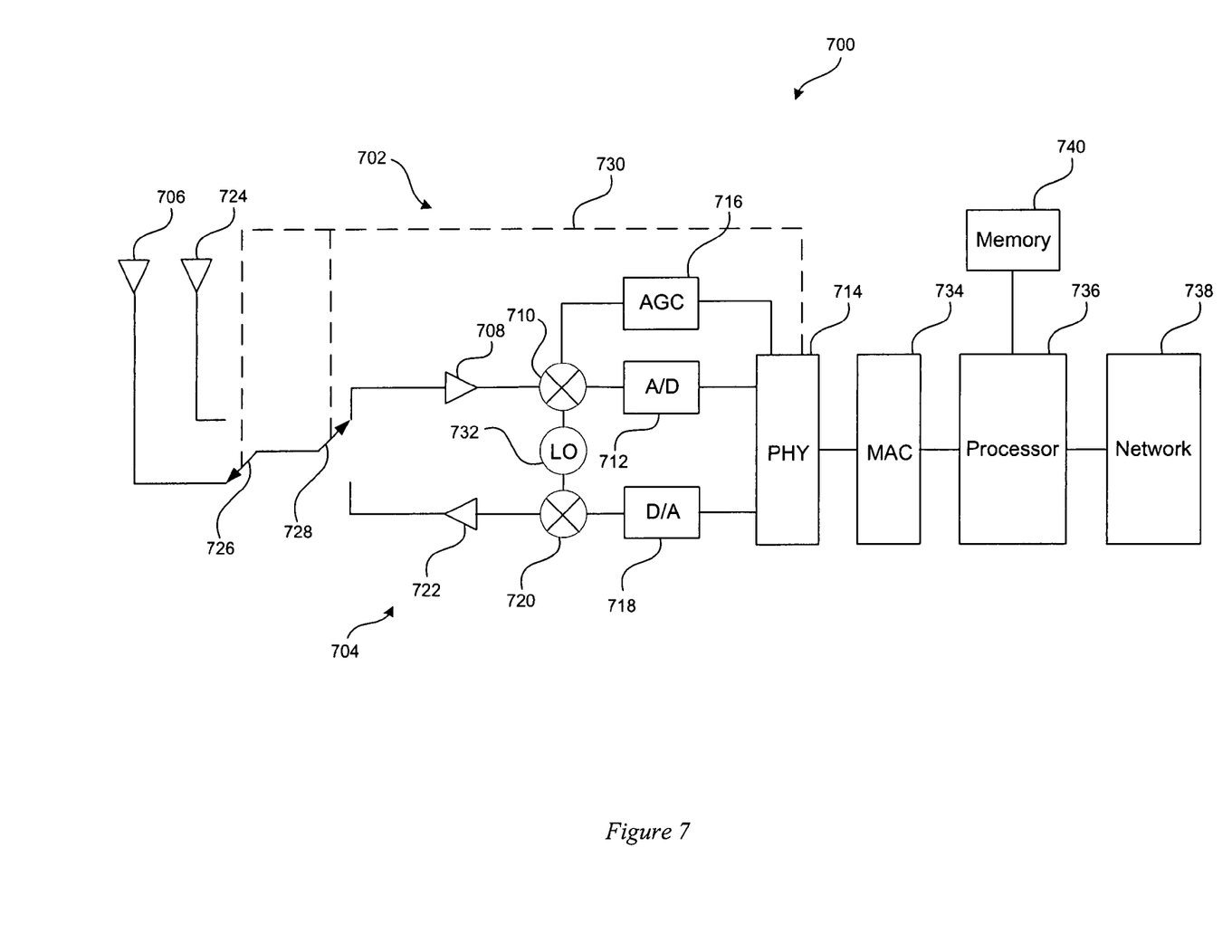
FIG. 7 is a functional block diagram of an access point in accordance with principles of the present invention.

Referring to FIG. 7, a functional block diagram of an access point 700 (e.g., access points 104a–n illustrated in FIG. 1) in accordance with principles of the present invention is shown. More specifically, access point 700 includes a receive path 702 for receiving packeted data on a reverse link channel and a transmit path 704 for transmitting packeted data on a forward link channel. Receive path 702 comprises antenna 706, low noise amplifier 708, frequency conversion process 710, analog-to-digital (A/D) converter 712, and physical interface (PHY) controller 714. Receive path 702 further comprises an automatic gain control (AGC) circuit 716 providing receive signal strength feedback signals. Similarly, transmit path 704 comprises physical interface controller 714, digital-to-analog (D/A) converter 718, frequency conversion process 720, power amplifier 722, and antenna 724. Physical interface controller 714 selects between receive path 702 and transmit path 704 using switches 726, 728, as indicated at reference numeral 730. A local oscillator 732 is used to select transmit and receive channels.

Physical layer interface controller 714 is advantageously an application specific integrated circuit and runs off of a clock, such as, for example, a 40 Megahertz clock (not shown). In other embodiments, physical layer interface controller 714 can include analog-to-digital converter 712 and digital-to-analog converter 718. Further, physical layer interface controller 714 performs modulation/demodulation.

Physical layer interface controller 714 is coupled to media access controller (MAC) 734, processor 736, and network 738. Media access controller 734 is likewise advantageously an application specific integrated circuit. Network 738 is fixed backbone network, such as fixed backbone network 106 shown in FIG. 1.

Processor 736 controls functions of access point 700, such as, for example, transmissions and receptions associated with a wireless link. Processor 736 is coupled to receive and transmit paths 702, 704 and local oscillator 732 and executes stored program code found in memory 740. Processor 736 is thus programmed to record and/or manage detected radar signals and to select communications channels for transmissions on forward, and by inference client return, links to prevent interference with radar systems in various ways depending upon its stored program code. As will be appreciated by those of ordinary skill in the art, a processor suitably includes a memory in alternative embodiments. In yet other embodiments, a memory is external to or not a part of access point 700. Processor 736 detects a radar signal by recording energy events, calculating temporal differences in recorded energy events to determine the presence of pulses, sorting intervals betweens pulses into histogram bins, each bin representing a range of time intervals between two pulses, each pulse indicative of a radar frequency, and limiting network traffic on a radar frequency based on a selected bin count.

Figure 8:
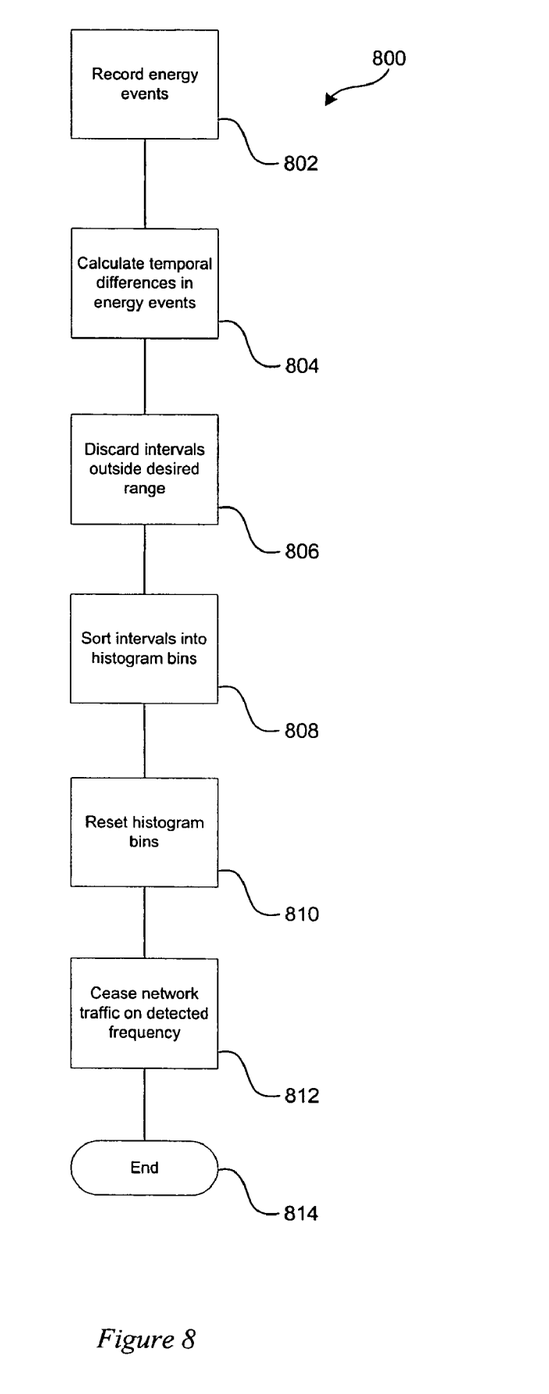
FIG. 8 is a flowchart illustrating the program flow of a method for a radar protection device for the access points shown in FIGS. 1, 3, and 7.

In view of the foregoing structural and functional features described above, methodologies in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. In addition, methodologies of the present invention can be implemented in software, hardware, or a combination of software and hardware.

Referring now to FIG. 8, a flowchart illustrating the program flow of a method 800 for a radar protection device for wireless networks is shown. The method 800 begins by recording, e.g., detecting, timestamping and/or logging, energy events in block 802. As used herein, energy events include, among other things, transmissions from radar systems, such as radar system 110 shown in FIG. 1.

For example, energy events are suitably recorded by receive path 338 responsive to controller 334, shown in FIG. 3 or receive path 702 responsive to processor 736, shown in FIG. 7. More specifically, energy events having an energy level rising above a specified threshold and an energy level falling below the specified threshold are recorded. Referring to FIG. 2, such a specified threshold is generally indicated at reference letter T. Moreover, such rising and falling events above and below specified threshold T correspond to the leading and trailing edges of pulses 202 as generally indicated by reference numerals 210 and 212, respectively. Similarly, a radar signal 410 exceeding a threshold of −64 dBm, as generally indicated by arrows 412 and 414, is shown in FIG. 4.

Still referring to FIG. 8 and at block 804, temporal differences in the recorded energy events are calculated to determine the presence of pulses. For example, the difference in time-stamps between corresponding portions, e.g., leading edges, of pulses 506, 508, 510, 514, etc. are used to calculate intervals A1, A2, B, A3, as shown in FIG. 5. At block 806, intervals between pulses that fall outside a range, e.g., either too narrow or too wide, are discarded as such intervals are not generally indicative of a radar signal.

At block 808, the intervals between pulses are sorted into a histogram including a number of bins. Each bin of the histogram represents a range of time intervals between two pulses. FIG. 6 shows an exemplary histogram 600. Accumulations in a single bin of the histogram represent intervals that have a periodicity within a margin of error equal to the range of the bin.

At block 810, the histogram is periodically reset, i.e., all accumulations in any bins of the histogram are discarded. For example, all of the bins are suitably reset once approximately every one hundred milliseconds. Alternatively, the oldest entries in the bins are purged, such as those older than, for example, 750 milliseconds. Any bin of the histogram exceeding a specified bins count, e.g., bin count 606, shown in FIG. 6, within the reset period indicates the presence of a number of similarly spaced pulses correlating to a high probability that a radar signal has been received. Generally, periodically resetting or purging old entries from the bins prevents false detections of radar signals.

At block 812, and using the bin count in the histogram as an indication of radar detection, transmission of interfering wireless network traffic is limited or ceased on the frequency that is detected, thereby reducing or eliminating interference with the radar system. To distinguish radar system transmissions from random high frequency pulses, wireless network traffic is ceased when the measurement intervals between pulses are concentrated in a small number of histogram bins, and thusly, uncorrelated detection is isolated from correlated binning due to radar periodicity. The method 800 ends in block 814.

In order for a wireless network to successfully share the spectrum with radar systems, a radar signal must be detected quickly, efficiently, and accurately. The foregoing method requires relatively low computational processing when compared with methods that use Fourier or Periodic Transforms, and results in high detection rates and low false alarm rates. Further, the foregoing method is robust in the presence of uncorrelated detection noise and is easily parameterized to account for differences in radar systems.

By virtue of the foregoing, there is thus provided a radar protection device and method that addresses the regulatory requirements and allows the co-existence of a wireless network with radar systems.

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. It will be understood that the present invention is applicable to any wireless network using packeted data. Moreover, such a network is not limited to operation in any particular frequency band; but rather, may operate at any frequency as desired. Further, the invention is not limited to operation in accordance with any standard or regulations. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for radar protection, comprising:
    recording energy events;
    calculating temporal differences in recorded energy events to determine the presence of pulses;
    sorting storing counts of intervals between pulses into a plurality of histogram bins, each bin representing a range of time intervals between two pulses, each pulse indicative of a radar frequency; and
    limiting network traffic on a frequency based on a one of the plurality of histogram bins having a bin count greater than a selected bin count.

2. The method for radar protection of claim 1, wherein energy events having a first energy level above a specified threshold and a second energy level below the specified threshold are recorded.

3. The method for radar protection of claim 1, wherein recording energy events includes at least one of detecting, time-stamping, and logging energy events.

4. The method for radar protection of claim 1, further comprising:
    discarding pulses having a width outside a desired range.

5. The method for radar protection of claim 4, wherein the desired range is approximately one to twenty microseconds.

6. The method for radar protection of claim 1, further comprising periodically resetting at least one of the histogram bins.

7. The method for radar protection of claim 6, wherein at least one of the histogram bins are reset once approximately every one hundred milliseconds.

8. The method for radar protection of claim 1, further comprising the step of:
    periodically purging the oldest entries in at least one of the histogram bins.

9. The method for radar protection of claim 8, wherein entries older than approximately 750 milliseconds are purged from the at least one of the histogram bins.

10. A radar protection device, comprising:
- a receive antenna and a receiver circuit configured to record energy events; and
- a processor coupled to the receiver circuit and configured to execute program code that allows co-existence with radar systems;
- the program code including instructions that command the processor to calculate temporal differences in the recorded energy events to determine the presence of pulses and store counts of intervals between the pulses into a plurality of histogram bins, each bin representing a range of time intervals between two pulses, each pulse indicative of a radar frequency;
- wherein the processor determines radar is present on a frequency responsive to a one of the plurality of histogram bins having a bin count greater than a predetermined bin count.

11. The radar protection device of claim 10, further comprising:
- a transmit antenna and a transmit circuit coupled to the controller;
- the program code further including instructions that command the processor to cause the transmit circuit to limit network traffic on the frequency having a bin count greater than the predetermined bin count.

12. The radar protection device of claim 10, further comprising:
- a memory coupled to the processor and configured to the store program code that allows co-existence with radar systems.

13. The radar protection device of claim 10, wherein the receive antenna and the receiver circuit are further configured to record energy events having a first energy level above a specified threshold and a second energy level below the specified threshold.

14. The radar protection device of claim 10, wherein recording energy events includes at least one of detecting, time-stamping, and logging energy events.

15. The radar protection device of claim 10, the program code further including instructions that command the processor to discard pulses having a width outside a desired range.

16. The radar protection device of claim 15, wherein the desired range is approximately one to twenty microseconds.

17. The radar protection device of claim 10, the program code further including instructions that command the processor to periodically reset at least one of the histogram bins.

18. The radar protection device of claim 17, wherein the at least one of the histogram bins are reset once approximately every one hundred milliseconds.

19. The radar protection device of claim 10, the program code further including instructions that command the processor to periodically purge the oldest entries in at least one of the histogram bins.

20. The radar protection device of claim 19, wherein entries older than approximately 750 milliseconds are purged from the at least one of the histogram bins.

21. A computer-readable medium of instructions for radar protection, comprising:
- means for recording energy events;
- means for calculating temporal differences in recorded energy events to determine the presence of pulses;
- means for storing counts of intervals between pulses into a plurality of histogram bins, each bin representing a range of time intervals between two pulses, each pulse indicative of a radar frequency; and
- means for limiting network traffic on a frequency based on a one of the plurality of histogram bins having a bin count greater than a selected bin count.

22. The computer-readable medium of instructions for radar protection of claim 21, wherein energy events having a first energy level above a specified threshold and a second energy level below the specified threshold are recorded.

23. The computer-readable medium of instructions for radar protection of claim 21, wherein the means for recoding energy events includes means for at least one of detecting, time-stamping, and logging energy events.

24. The computer-readable medium of instructions for radar protection of claim 21, further comprising:
- means for discarding pulses having a width outside a desired range.

25. The computer-readable medium of instructions for radar protection of claim 24, wherein the desired range is approximately one to twenty microseconds.

26. The computer-readable medium of instructions for radar protection of claim 21, further comprising:
- means for periodically resetting at least one of the histogram bins.

27. The computer-readable medium of instructions for radar protection of claim 26, wherein the at least one of the histogram bins are reset once approximately every one hundred milliseconds.

28. The computer-readable medium of instructions for radar protection of claim 21, further comprising:
- means for periodically purging the oldest entries in at least one of the histogram bins.

29. The computer-readable medium of instructions for radar protection of claim 28, wherein entries older than approximately 750 milliseconds are purged from the at least one of the histogram bins.

* * * * *